Sept. 28, 1943.   W. R. WILEY   2,330,770
CLIP CONSTRUCTION
Original Filed Sept. 5, 1939

INVENTOR
William R. Wiley.
BY
Harness, Dickey & Pierce.
ATTORNEYS.

Patented Sept. 28, 1943

2,330,770

UNITED STATES PATENT OFFICE 2,330,770

CLIP CONSTRUCTION

William R. Wiley, Birmingham, Mich.

Original application September 5, 1939, Serial No. 293,336. Divided and this application January 22, 1942, Serial No. 427,707

2 Claims. (Cl. 24—73)

The present invention relates generally to sheet metal clips and more particularly to a resilient clip construction designed and intended for anchoring a channel-shaped molding having inturned flanges to a sheet metal panel having apertures therethrough.

The present application is an improvement over the construction described and claimed in applicant's prior Patent No. 2,084,717, issued June 22, 1937, and is a division of applicant's copending application Serial No. 293,336, filed September 5, 1939, now Patent No. 2,275,119, granted March 3, 1942.

The principal object of the present invention is to provide a clip construction which has particular advantages when used for securing relatively wide or wide and shallow moldings to a panel and is particularly concerned with the provision of a clip construction in which means are provided to preclude distortion or deformation of the clip when the same is inserted into the aperture in the panel in order to anchor the molding strip in position.

Other and further objects of the invention will become clearly apparent from the following specification when considered in connection with the accompanying drawing forming a part thereof.

Figure 1:
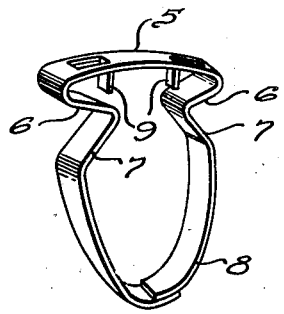
Figure 1 is a perspective view of a clip embodying the improvements of the present invention.

With more particular reference to the drawing, it will be seen that the clip constructions with which the present invention is concerned may easily and conveniently be formed from a strip of sheet metal bent to provide a closed loop. Adjacent the middle, the strip is formed to provide a head portion 5 and the strip is bent inwardly at each of the sides of the head portion to provide generally converging cam surfaces 6 which serve to engage the marginal edges of the molding flanges.

Figure 2:
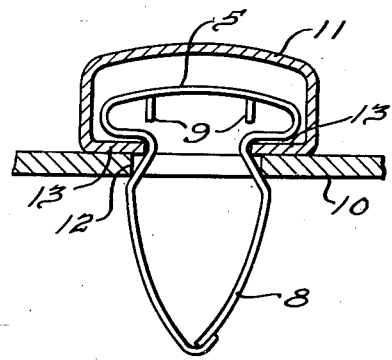
Figure 2 is a fragmentary, sectional view taken transversely through a channel-shaped molding strip having inturned flanges, and an adjacent section of the panelling showing the manner in which the clip illustrated in Figure 1 serves to anchor the molding in position against the face of the panel.

The strip is then bent outwardly to provide cam surfaces 7 adapted to engage the margin of the aperture in the panel and the ends of the strip then project downwardly to provide a resilient tapered prong portion generally designated 8 and, as is clearly seen in Figures 1 and 2, the ends of the strip are interlocked to preclude relative movement therebetween.

A pair of lugs 9 are struck out of the strip in the head portion to provide downwardly projecting fingers which serve to prevent collapse or substantial deformation of the head portion during mounting of the molding on the panel. As is clearly seen in Figure 2 of the drawing, a sheet of panelling 10, to which a molding strip 11 is to be secured, is provided with a suitable aperture 12. The molding strip 11 is provided with inturned flanges 13 and the clips are inserted into the axial end of the molding strip with the cam surfaces 6 engaging flanges 13 of the molding strip.

As is conventional in assemblies of this general type, a plurality of clips are mounted in the molding strip at spaced intervals corresponding to the spacing of the apertures 12 in the panelling to which the molding is to be secured. The prong portions 8 of the clips are then inserted through the apertures 12 and the molding pressed toward the panelling.

The resiliency of the material of which the clip is formed permits the prong portion 8 to spring through the aperture and the cam surfaces 7 engage the margin of the aperture thereby anchoring the molding with its flanges tightly against the exterior surface of the panelling.

Inasmuch as the prong portion of the clip is generally tapered to facilitate insertion of the clip in the aperture, and inasmuch as the engagement of this tapered prong portion of the clip causes deformation of the prong portion to an extent sufficient to permit its insertion in the aperture, it quite frequently occurs that one side of the clip engages the margin of the aperture with considerably greater force than the opposite side.

In clips of this type, used for anchoring relatively wide moldings, this condition tends to cause a collapse of one side of the head portion of the clip and may result in such a complete deformation of the clip as to prevent its serving its intended function. In order to overcome this objection, the present invention contemplates the provision of the outstruck lugs 9 which serve to prevent collapse of the head portion of the clip beyond a predetermined point and thereby maintain the proper form of the prong portion during insertion in the aperture.

Figure 3:
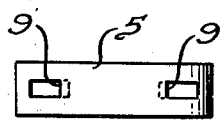
Figure 3 is a top plan view of the clip shown in Figures 1 and 2.
Figure 4:
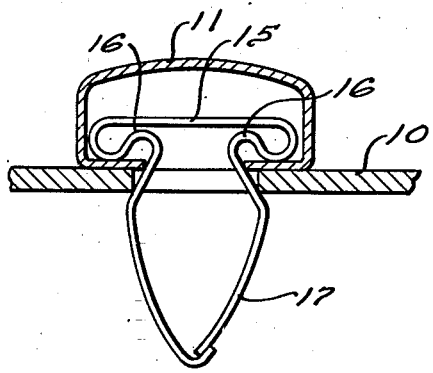
Figure 4 is a transverse sectional view similar to Figure 2 illustrating a modified form of the clip construction embodying the invention herein set forth.

A modified form of the invention is shown in Figure 4 of the drawing in which a clip is formed somewhat similarly to that shown in Figures 1, 2, and 3 and comprises a sheet metal strip formed to provide a head portion 15. The strip of metal is then reversely bent upon itself to provide forwardly extending portions 16 which come in close proximity to the head portion 15 and serve the same purpose and function as the lugs 9 described in the preferred embodiment of the invention above.

This clip, shown in Figure 4, includes a prong portion 17 similar in construction and function to that described in the preferred embodiment of the invention. It will be seen that the clip construction shown in Figure 4 eliminates the necessity of forming the outstruck lugs 9 and yet at the same time provides a head construction for the clip which will have much the same function as that described in connection with the preferred embodiment of the invention shown in Figures 1 to 3.

The clip shown in Figure 4 differs from the clip shown in Figures 1 to 3, inclusive, further in the respect that the cam surfaces 6 which engage the margin of the flanges of the molding strip are dispensed with and the head portion of the clip engages the interior surfaces of these flanges. In other respects, the operation and function of the two clips is substantially the same.

Many other and further modifications of the invention may be made without departing from the spirit and scope of the invention as set forth in the subjoined claims.

What is claimed is:

1. A clip for anchoring a channel-shaped molding having inturned flanges to a sheet metal panel having an aperture therein comprising a sheet metal strip bent to form a closed loop, said strip being bent to form indentations in opposite sides thereof whereby to provide a central portion having a dimension less than the portions above and below said central portion thereby providing a head portion adapted to be received within said molding strip and a prong portion adapted for insertion through the aperture in said panelling, said head portion including means for preventing collapse thereof when said prong portion is inserted into said aperture, outstruck lugs on said strip projecting inwardly of said loop and adapted to engage said strip adjacent the central portion of said clip to preclude collapse of the head portion thereof when said prong portion is inserted into the aperture in said panel.

2. A clip for securing a channel-shaped molding against the face of a sheet metal panel having an aperture therein comprising a sheet metal strip formed to provide a closed loop, said strip being shaped to provide indentations on opposite sides thereof, the central portion of said clip constituting a head on one side of said indentations and adapted to be received within the channel of said molding, instruck tabs formed in said central portion and extending toward and closely adjacent to the adjacent sides of said indentations providing stops against which the sides of said indentations may abut when said clip is inserted in the aperture in said panel.

WILLIAM R. WILEY.